United States Patent [19]
Oakley et al.

[11] Patent Number: 4,956,707
[45] Date of Patent: Sep. 11, 1990

[54] ADAPTIVE GRAPHICS VIDEO STANDARDS FORMAT CONVERTER USER-INTERFACE

[75] Inventors: David Oakley; Michael J. Hellmer, both of San Diego, Calif.

[73] Assignee: Megatek Corporation, San Diego, Calif.

[21] Appl. No.: 387,487

[22] Filed: Jul. 27, 1989

[51] Int. Cl.⁵ .................. H04N 7/01; H04N 11/20; H04N 5/222
[52] U.S. Cl. ....................................... 358/140; 358/11; 358/185; 364/521
[58] Field of Search .................. 358/140, 11, 185, 138; 364/521

[56] References Cited
U.S. PATENT DOCUMENTS

| | | |
|---|---|---|
| 4,167,022 | 9/1979 | Dischert et al. ............ 358/185 |
| 4,234,890 | 11/1980 | Astle et al. ................ 358/185 |
| 4,700,230 | 10/1987 | Pshtissky et al. .......... 358/185 |
| 4,719,644 | 11/1988 | Hergog et al. ............. 358/140 |
| 4,872,054 | 10/1987 | Grouj et al. ............... 358/140 |

Primary Examiner—John K. Peng
Attorney, Agent, or Firm—Baker, Maxham, Jester & Meador

[57] ABSTRACT

An adaptive video format user-interface for use with a conventional video standards converter. A microcontroller interrogates a function switch matrix in the set-up mode and interfaces with the converter to effect video output changes by matching the two dimensional sampling aperture of the converter to the timing of the incoming video.

14 Claims, 7 Drawing Sheets

ADAPTIVE GRAPHICS VIDEO STANDARDS FORMAT CONVERTER USER-INTERFACE

FIELD OF THE INVENTION

This invention relates generally to video converters, and more particularly to a novel digital video standards converter user-interface for transforming video in one format to video in another format, the interface having simplified set-up procedures and having resulting high image quality.

BACKGROUND OF THE INVENTION

Video converters have many purposes. One is to convert images from the computer graphic format to a television format. Applications of such transformed images include demonstration tapes, training, animation, design reviews, legal evidence, video transmission and distribution, and presentations.

Commonly, video cameras have been employed to record the computer graphics images from a display screen and provide the desired transformation to television format, which can then be recorded or distributed over a network. However, this technique results in many disadvantages, at least partially resulting from the additional transformation involved. Some of the difficulties include corruption of the chrominance and luminance levels, greater than expected loss of resolution, geometric distortion and no genlock or sync.

Alternatives to the video camera conversion system include hard wired video standards converters. Video signals in one format are applied to the converter input and video signals in the predetermined different format are outputted from the converter to appear on another video display screen. These, too, have disadvantages. Many currently available video standards converters must be disassembled for set-up to accommodate any variations in input parameters. To make such changes in these products, specifications of incoming video signals must be known, the unit dismantled, PROM's, PAL's, and crystals replaced, switches reset, and finally, the unit reassembled. The real problem arises from the fact that within the same category rating, for example, 1000-line graphics, the video signals have slightly different formats due to specification of the clock rates, aspect ratio, vertical and horizontal front and back porches, and sync periods. If the sampling apertures are not set correctly, the image will not be correctly centered or sized when displayed in the new format, such as RS170A.

SUMMARY OF THE INVENTION

Broadly speaking, this invention provides an adaptive, interactive user-interface for a video standards converter resulting in a high quality converted image with simplified set-up.

This invention incorporates an interactive user interface to facilitate adjustment of controls while observing the converted image on a video screen. The interactive user interface also enables the converter to be rapidly adjusted to readily receive and convert video from several alternative sources within the same category rating, for example, 1000-line graphics, without dismantling the unit or replacing any components. Thus this converter accommodates variations in the clock rate, aspect ratio, vertical and horizontal front and back porches and sync period. The graphics video can then be converted to other formats, for example, RS170A television format.

The basic technique employed by the converter is two-dimensional spatial resampling. The process permits images to be converted without discarding pixels. Pixel discarding is a technique previously widely used. Chrominance and luminance distortion are insignificant and the process does not add undesirable artifacts. Set-up consists of matching the two dimensional sampling aperture of the converter to the timing of the incoming video. Connections to a graphics terminal or work station can be made simply through video cables and BNC connectors, and front panel controls allow interactive tuning of the converter for the incoming video signal matching.

In addition to accepting video signals with slightly different timing parameters in the category rating, that is, from alternative sources having, for example, 1000-line graphics, the converter of this invention can be rapidly set-up to immediately select functions like image size, freezeframe, diagnostics and run. Image parameters can be changed interactively by depressing control function switches on a panel.

Functions are initiated by depressing a panel switch in a switch array which is monitored by a microcontroller. Routines are called to execute the function of the switch. The microcontroller then interfaces with the horizontal and vertical filters and the video encoders of the converter to execute the set-up functions. By interfacing the function switches through the microcontroller, the video standards converter is set up to provide a clear, full-frame video in a transformed format corresponding to the video in the originating format, and all that is accomplished from the front of the unit in a matter of minutes without dismantling the unit or changing any components.

BRIEF DESCRIPTION OF THE DRAWING

The objects, advantages and features of the invention will be more readily perceived from the following detailed description, when read in conjunction with the accompanying drawing, in which:

FIG. 3 is an elevation view of the front of the unit of FIG. 2 showing the function switches;

DESCRIPTION OF THE PREFERRED EMBODIMENTS

A video standards converter accepts video in one format such as 110 MHz, 1000-line graphics, and transforms it to another format, such as RS170A, which has a 4.3 MHz bandwidth and 483 displayed lines. In this case the converted image will appear to be defocussed. In other applicaitons, depending upon whether resolution is increased or decreased, there may be improvement or degradation of image definition, for example, trans-atlantic conversion between U.S. 525-line/60 Hz NTSC (National Television Standards Committee) video and European 625-line/50 Hz PAL (Phase Alternating Line) video.

Nominal resolution of incoming computer graphic images is 1280×1024 pixels. With a horizontal sampling rate of four times the subcarrier frequency, output image resolution for the RS170A television format is 752×483 pixels. To avoid aliasing effects, images are low-pass filtered prior to resampling in the horizontal and vertical directions. A range of 1000-line images with different dimensions and timing parameters may be accommodated by adjustment of stored coefficients through the interactive user interface.

Figure 1:
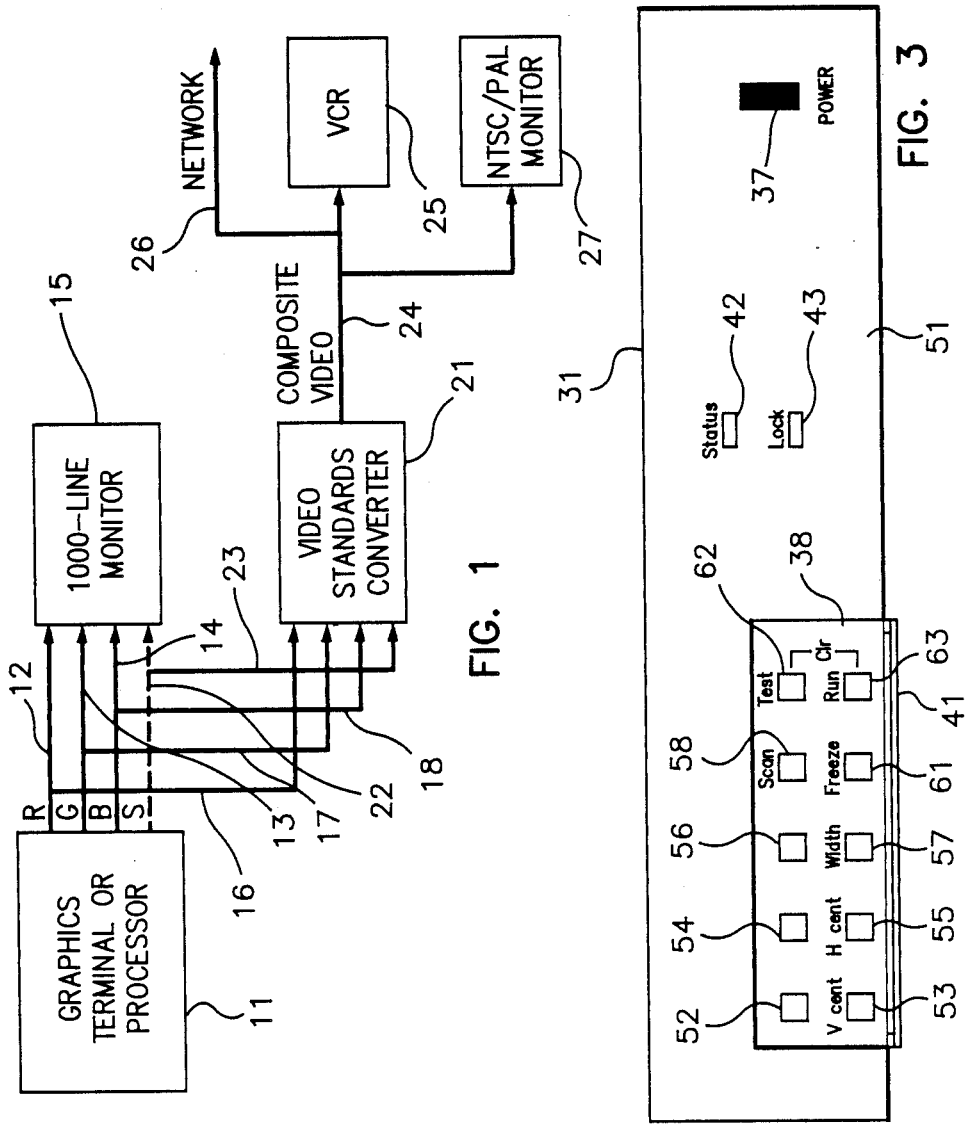
FIG. 1 is a functional block diagram of a digital video standards converter configured to record graphics on a VCR.

With reference to FIG. 1, it can be seen how a standards converter can be connected to a computer graphics terminal or workstation. Composite video can be recorded on a VCR, distributed over a network or presented in real time on a monitor. As stated previously, the invention may be employed to convert one video format to another video format. By means of the system shown in FIG. 1, 1000-line graphics may be converted either to U.S. RS170A or European PAL video. Graphics terminal 11 is shown with red, green and blue communication lines 12, 13 and 14 connected to 1000-line monitor 15 in normal fashion. These red, green and blue lines are tapped off by means of lines 16, 17 and 18 which are coupled to video standards converter 21. Optional synchronization signal line 22 is tapped off by means of line 23 and is also coupled to the video standards converter. Output of the video standards converter is a composite video on line 24 which may be employed to be recorded on VCR 25, to be distributed over a network by means of line 26, or to be shown in real time on monitor 27.

Figure 2:
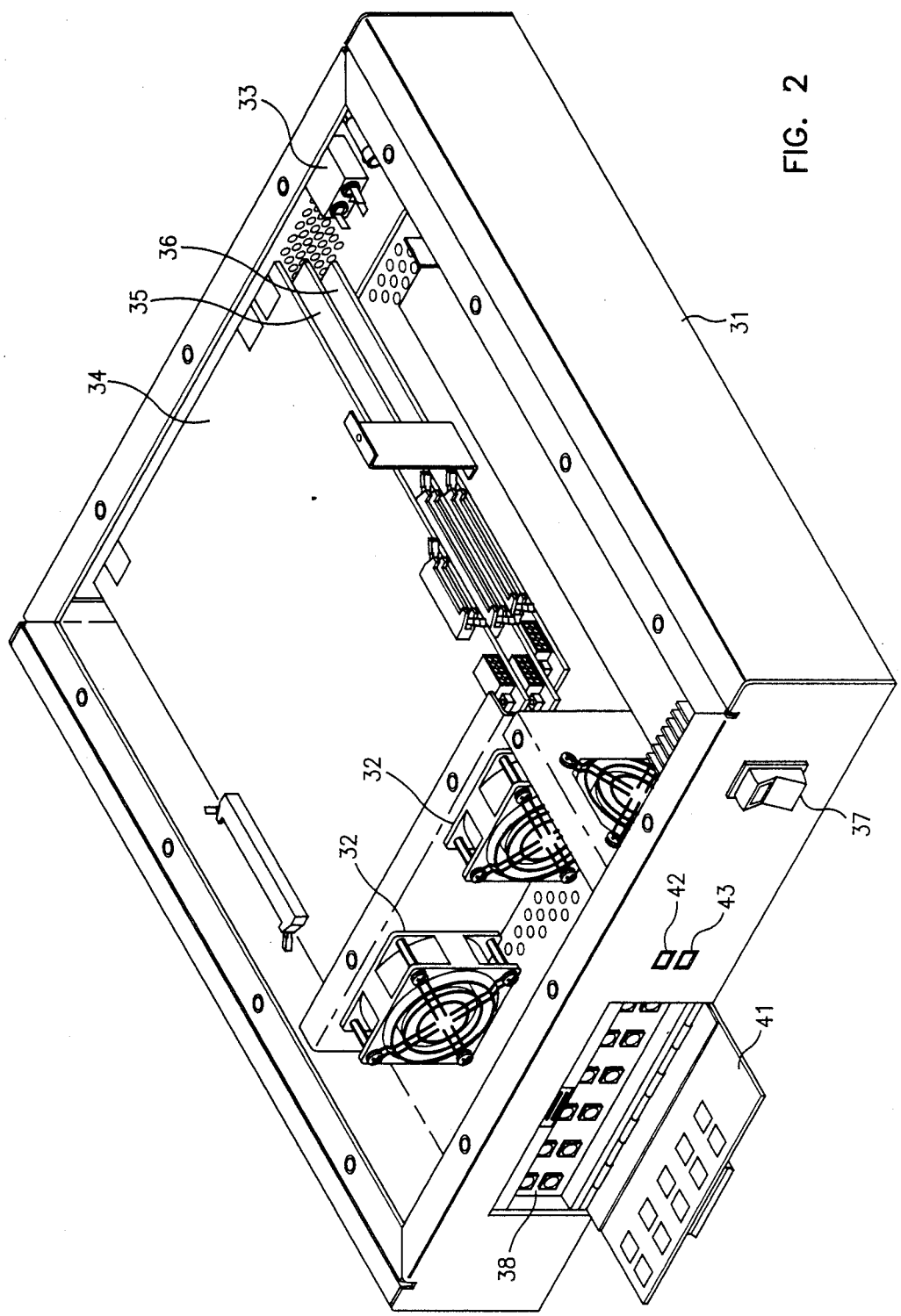
FIG. 2 is an isometric view of the video standards converter of this invention as it would appear in the hardware form and with the enclosure top removed.

The video standards converter is shown in FIG. 2 in somewhat diagrammatic isometric form. Housing 31 includes cooling means such as fans 32 and means for making external connections, such as connector receptacle 33. The functions of the invention which are included with the video standards converter are included on circuit boards 34, 35 and 36. The functions of these boards will be described in more detail hereinbelow. The front of housing 31 includes power switch 37 and function control panel 38 which is covered by hinged door 41. Also shown on the front panel of housing 31 are status indicator 42 and lock indicator 43. There are many other aspects of the contents of housing 31, but they are not relevant to this discussion.

Figure 4:
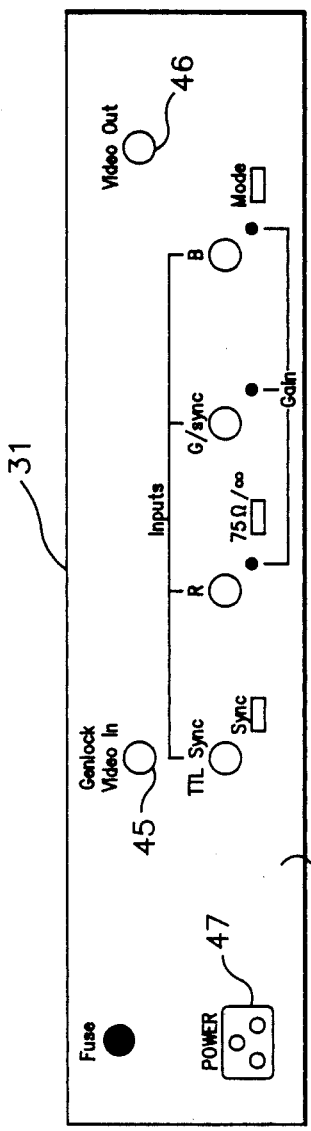
FIG. 4 is an elevation view of the rear of the unit of FIG. 2 showing the connector positions.

The externally accessible connections and functions of the front and back panels of housing 31 are shown in FIGS. 3 and 4. The connections to back panel 44 are relatively straightforward. The connectors labelled "TTL Sync," "R," "G/Sync" and "B" are for receipt of the video and optional separate sync signals from originating graphics terminal 11. If needed, external video for synchronization may be applied to "Genlock Video In" connector 45. The output video from the standards converter contained within housing 31 is by means of connector 46, labelled "Video Out." Power is applied at connector 47. Other inputs are straightforward and need not be discussed here.

Front panel 51 of housing 31 is shown in FIG. 3. Power switch 37 corresponds with that shown in FIG. 2. Status indicator 42 and lock indicator 43 are also shown. The switches normally concealed behind hinged door 41 on panel 38 include vertical centering switches 52 and 53, horizontal centering switches 54 and 55, horizontal width switches 56 and 57, scan switch 58, freezeframe switch 61, and test and run switches 62 and 63.

Figure 5:
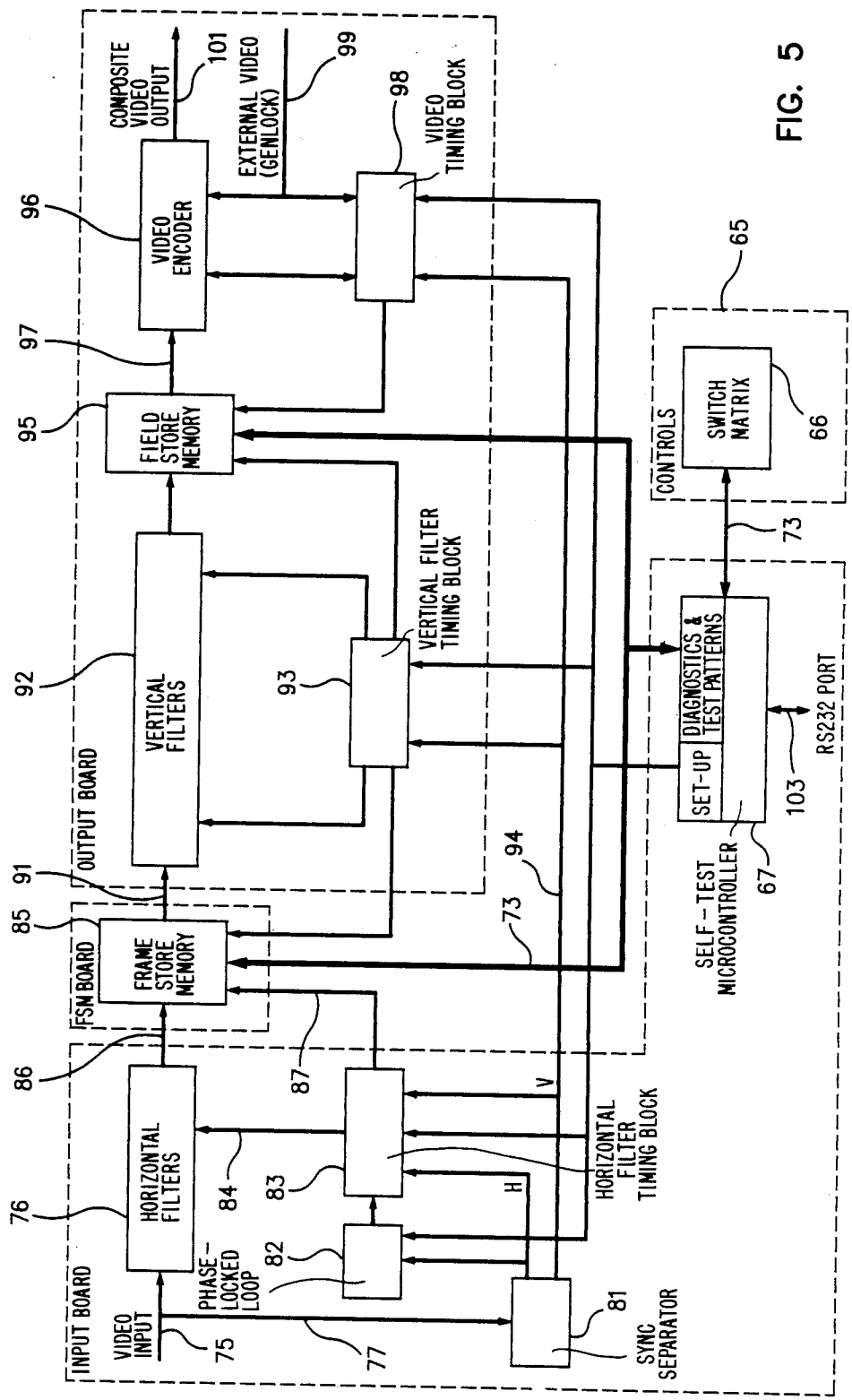
FIG. 5 is a functional block diagram of the video standards converter and interface of the invention showing the control switch matrix and the microcontroller in functional diagram form.

FIG. 5 shows in block diagram form the adaptive, interactive standards converter and user interface of the invention. All of the blocks above the microcontroller and switch matrix blocks are typical of the currently available video standards converters having predetermined input and output. By "predetermined" it is meant that the input and output and the transformation functions are fixed and in order to make modifications to accommodate the different timing parameters inherent in moving from one video input signal to another, whether they are in different formats or have slight differences within the same format, actual physical changes in the converter must be accomplished. It is the main function of the present invention, by the means of controls 65 comprising switch matrix 66, and microcontroller 67, with its set-up and diagnostics capabilities, to transform the conventional fixed parameter converter into the adaptive, interactive video standards converter of the invention. The switch matrix corresponds with function control panel 38 of FIG. 3 and the microcontroller acts as the active interface between the function switches and the converter circuitry to make possible the high quality converted image resulting from use of the invention.

Figure 6:
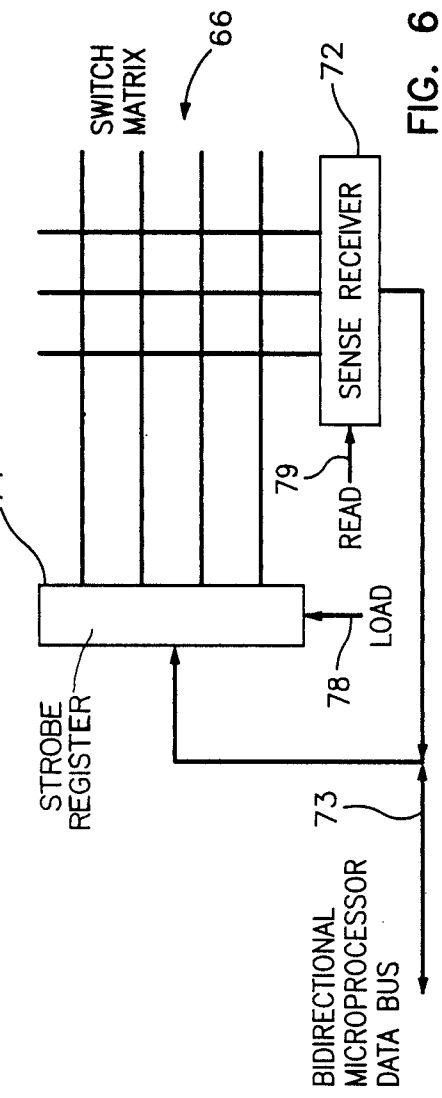
FIG. 6 is a simplified representation of the switch matrix of FIG. 5.

Switch matrix 66 is shown in more detail in FIG. 6. This matrix functions in relatively conventional manner where the rows are connected to strobe register 71 and the columns are connected to sense receiver 72. The information is inputted to the switch matrix and read from it over data bus 73. This is the connection between the switch matrix and the microcontroller.

The following discussion, while applicable to a variety of possible transformations performed by this converter, will describe the 1000-line format graphics transformed to the RS170A format, it being understood that this is by way of example only. In this case, the nominal resolution of incoming images is 1280×1024 pixels. The desired output image resolution is 752×483 pixels. In the block diagram of FIG. 5, the two dimensional resampling of the images is divided into two processes: horizontal and vertical. The 1000-line image from the work station or terminal on line 75 is in the raster format, so pixels are output in a horizontal stream. These pixels are initially filtered and then resampled by means of analog-to-digital converters in horizontal filters 76. Video input signals are also passed through line 77 to sync separator 81. The horizontal sync signal is acted upon by phase-locked-loop 82 to generate the resampling clock pulse stream which is nominally at a 55 MHz frequency. This clock signal is fed to horizontal filters 76 through line 84. The vertical sync signal is also applied to timing block 83. This resampling process results in 752 samples per horizontal line instead of the original 1280.

The next step is to write the image, row-by-row, into frame-store memory 85 which includes an input via line 86 from the horizontal filters and an input via line 87 from the horizontal filter timing block. The output of frame store 85 is read out column-by-column (+90° rotation) on line 91. Columns of pixels in the original image are now low-pass filtered prior to resampling at the RS170A field resolution. That output from the field store is applied to vertical filters 92. The vertical sync signal is applied to vertical filter timing block 93 over line 94 from sync separator 81. Both the horizontal and vertical filters incorporate analog to digital converters and the vertical filter incorporates digital to analog converters.

The output of vertical filters 92 is entered into field store memory 95, column-by-column, the output therefrom being read row-by-row (−90° rotation) and applied to video encoder 96 over line 97. A vertical sync signal is applied to video timing block 98 over line 94. Field store memory 95 includes inputs from vertical filter timing block 93 and from video timing block 98. An output from the video timing block is also applied to the video encoder. Finally, composite video output 101, which may be in the RS170A format, emerges from video encoder 96. If needed, external video. (genlock) signals are applied to video encoder 96 and video timing block 98 via input line 99.

We will now describe in further detail the user-interface. Connections from the graphics terminal or workstation to the converter can be made simply through video cables with BNC connectors. The controls of front function control panel 38 allow tuning of the converter to match the incoming video format.

Set-up consists of matching the two dimensional sampling aperture of the standards converter to the timing of the incoming video signals and is greatly simplified by this invention because the user can interactively adjust the front panel controls while observing the converted image on a monitor. Also, with an interactive user interface, the converter can be rapidly adjusted to receive video from several different sources within the same category rating, in our example, 1000-line video. Even if terminals and workstations are specified to output 1000-line video, there are usually differences in the video timing parameters. The video standards converter of this invention can be readily set up to accept 1000-line video signals with slightly different timing parameters, and to immediately select functions such as image size, freezeframe, diagnostics and run. Image parameters can be changed interactively by depressing switches on a panel, as shown on panel 38 of FIG. 3, comprising switch matrix 66 of FIGS. 5 and 6. As explained previously, conventional video standards converters must be disassembled for set-up. For those devices, specifications of incoming video must be known, the unit dismantled, PROM's, PAL's and crystal replaced, switches reset, and finally, the unit reassembled.

The standards converter of this invention may be connected to various types of 1000-line video signals which may have slightly different formats due to specification of the video clock rates, aspect ratio, vertical and horizontal front and back porches, and sync period. If the sampling apertures are not set correctly, the image will not be correctly centered or sized when displayed on a monitor in the RS170A format. A significant function of the user interface of this invention is convenient set-up of the sampling apertures. Several other functions are also included in the invention and are controlled by the push buttons of the front panel function controls.

To reiterate, microcontroller 67 monitors the switch array of controls 65 and senses if a switch has been pressed or closed. Routines are then called to execute the function of the switch. The psuedocode listed in Table 1 outlines the operation of the microcontroller code.

TABLE 1

Switch Functions Pseudocode

PROCEDURE switch
WHILE switch_depressed
poll_switch
{examine switch_flags}
IF vertical_up THEN increment vertical-delay
IF vertical_down THEN decrement
vertical-delay
IF horizontal_right THEN decrement
horizontal_delay
IF horizontal_left THEN increment
horizontal_delay
IF horizontal_in THEN decrement
phase_locked_loop_multiplier
IF horizontal out THEN increment
phase_locked_loop_multiplier
IF scan THEN toggle scan_mode
IF freeze THEN disable capture
IF run & !test THEN GOTO run_mode
IF test & !run THEN select and draw test_pattern
IF run & test THEN GOTO soft_reset
{end examine switch flags}
timeout
decrease timeout_constant
END WHILE
END switch
PROCEDURE poll-switch
Clear all switch_flags
FOR a = 0 TO 3 {a is the row no.}
assert active_line a
read sense_lines (0:2)
FOR s = 0 to 2 {s is the column no.}
IF sense_line s = active THEN set
switch_flag (a,s)
{a x s array of switches. Status of
each switch is an array element}
END FOR
clear activate_line a
END FOR
END poll_switch In the above psuedocode, it should be noticed that there are several registers and flags that are controlled. Registers include vertical_delay, horizontal-delay and phase_locked_loop_multiplier. Flags are switch_flags, scan_mode, capture and run_mode. Test_pattern and soft_reset are subroutines.

Depressing a switch initiates PROCEDURE switch. First, PROCEDURE poll_switch is called to strobe, over LOAD line 78, the switches row-by-row with strobe register 71 as shown in FIG. 6. A row is activated by loading data into a register from bidirectional microcontroller data bus 73. Read line 79 functions similarly for sense receiver 72. For each of the four rows, three column sense data from receiver 72 is read over bidirectional bus 73 into a register in the microcontroller containing the switch _flags data. Each bit in this register is a flag corresponding to the status of a particular switch. At this point, PROCEDURE poll_switch ends and PROCEDURE_switch continues.

Next, each of the switch _flags register bits is examined to determine the selected function which is executed by a subroutine call. For example, increment vertical_delay will call a subroutine that increases the count in the vertical delay register so that the picture will move upward. The last three IF's of Table 1 are exceptions, since IF run and test are depressed simultaneously, then soft$_{13}$ reset is called. After the IF's, the timeout routine sets the period between parameter increments or decrements when a switch is held. Initially the period is long to allow for single steps and accurate adjustment. Each time through the WHILE loop, the timeout period is decreased to permit fast adjustment if the switch is held down for a larger change in value. It is not necessary to provide further details of the implementation of the switch functions because the example, together with Table 1, is adequate disclosure for a person skilled in the applicable art.

Figure 7:
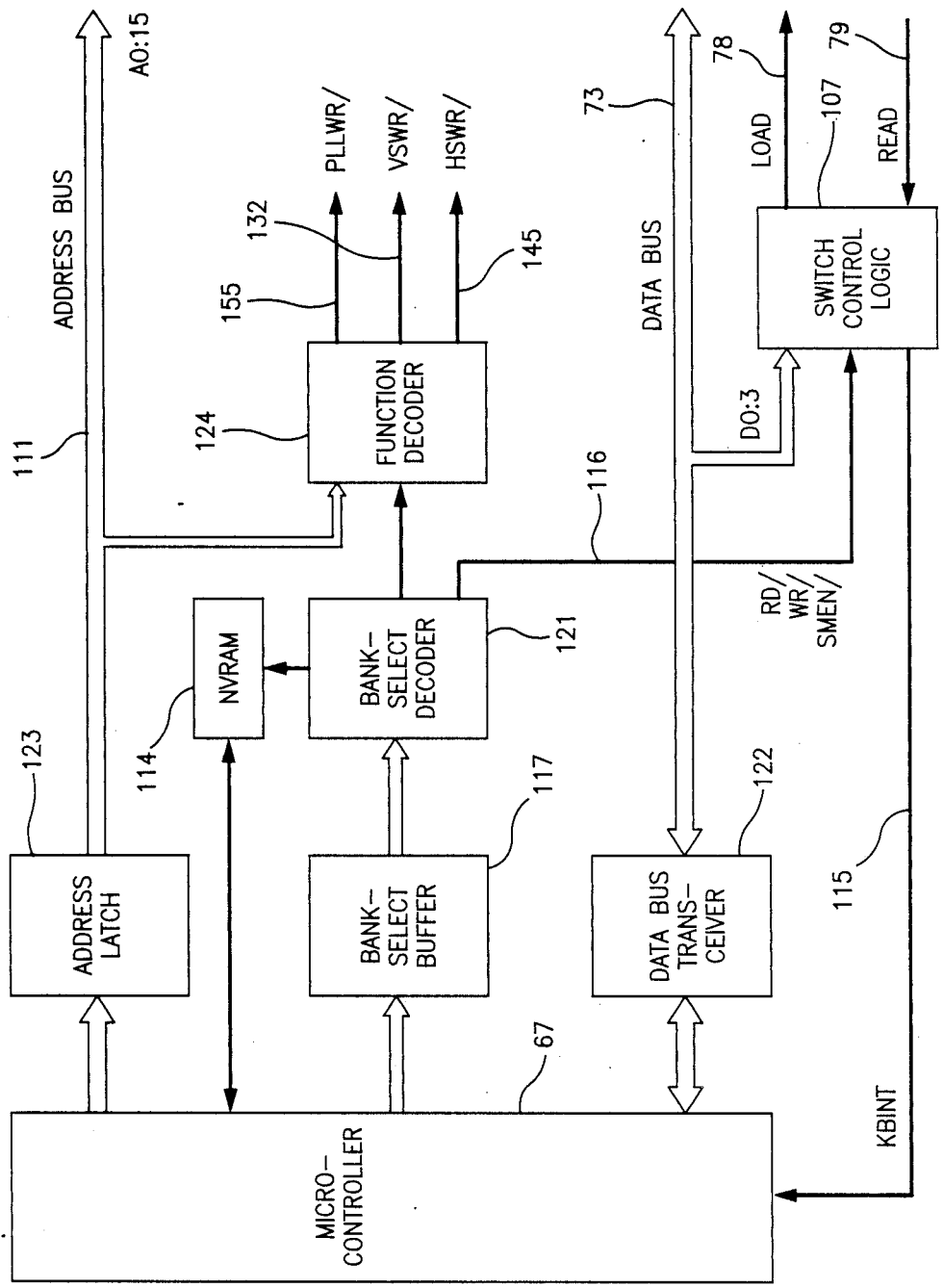
FIG. 7 is a functional block diagram of the microcontroller in the set-up mode.

Somewhat greater detail of the set-up function of the user interface of the invention follows. The microcontroller and initial set-up functions are depicted in FIG. 7. When power is turned on, or after a reset, microcontroller 67 reads stored values of the set-up parameters that are stored in its nonvolatile random access memory (NVRAM) 114. Then the power-up routine writes these values to registers using other routines that are described below. Upon completion of the power-up routines, if a switch of FIG. 6 is depressed, a keyboard interrupt (KBINT) signal on line 115 causes the microcontroller to jump to a routine that emits a switch matrix enable signal (SMEN/) and read and write signals (RD/ and WR/), all over line 116. Bits D0:3 of data bus 73 sequentially activate the rows of the matrix through strobe register 71 (FIG. 6). For each activation, the matrix column lines to sense receiver 72 are read and the data transferred onto bits D0:2 of data bus 73. Within the microcontroller, the SENSE data is decoded and the identity of the depressed switches is determined and stored in a set of registers, also within the microcontroller.

Essential details of the software routines have been described above with respect to Table 1, but the relation of the software routines to the hardware will be further clarified here. During the conversion or transformation process, the sole function of the microcontroller is to monitor the status of the switches and to issue commands and to direct data to hardware registers that execute the switch functions. Until a switch is depressed, the microcontroller remains in a SLEEP mode. Closure of a switch contact initiates an interrupt routine which activates the PROCEDURE switch as indicated in Table 1. The PROCEDURE poll_switch activates switch control logic 107 of FIG. 7 and reads in data off data bus 73. In the PROCEDURE switch, the functions initiated by each conditional identifier, THEN, include both update of internal registers, writing the data out of the respective hardware register, and update of the stored data in the NVRAM, which is the default data at power-on.

Referring again to FIG. 7, data is written out on data bus 73 to hardware registers that are selected by the lower bits of address bus 111. Similarly, functions such as WR/ and RD/ that are decoded from the bank-select outputs of bank-select buffer 117 and bank-select decoder 121 are appropriately employed. The necessary data bus transceiver 122 is in data bus 73 and address latch 123 is in address bus 111. Function decoder 124 emits signals which will be described below.

Figure 8:
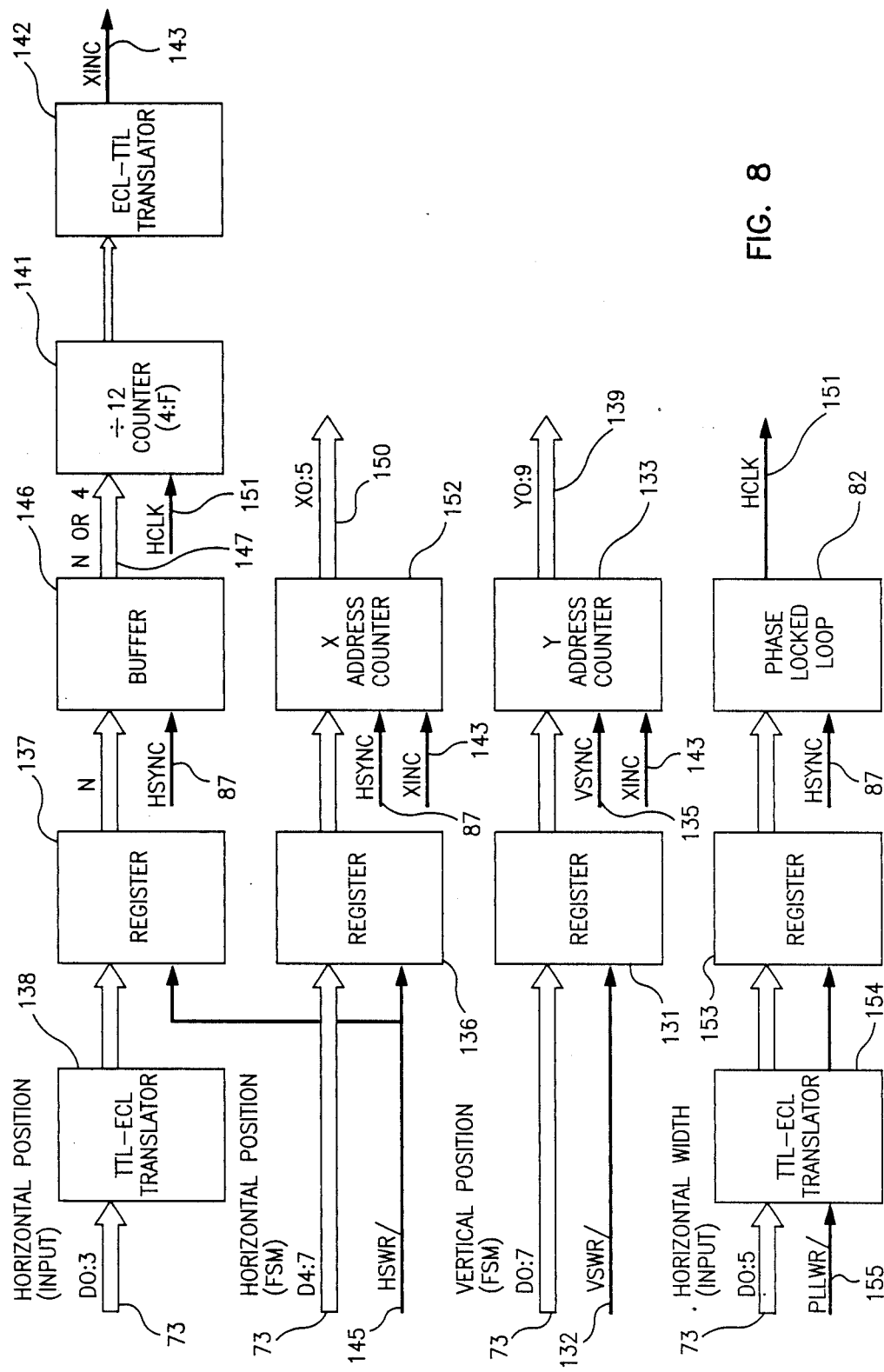
FIG. 8 is a functional block diagram of the width and position functions of the converter interface in the set-up mode as controlled by the microcontroller of FIG. 7.

Execution of each of the front panel functions will now be described. If the vertical position of the image is to be changed, then the contents of the vertical position microcontroller register are written onto data bus 73 and stored in register 131 (FIG. 8) in frame store memory (FSM) 85 (FIG. 5) by the vertical start write pulse (VSWR/) on line 132 as shown in both FIGS. 7 and 8. This position data is loaded into FSM Y address counter 133 by the incoming vertical sync pulse (VSYNC) on line 135 (FIG. 8). The output of the Y address counter is Y0:9 over line 139. In the overscan mode, the nominal value of that position data is approximately D9 hex. Employing push buttons 52 and 53 (FIG. 3), incrementing the value moves the image up and decrementing the value moves it down.

Horizontal positioning is divided into fine and coarse adjustments on the input and FSM boards. On the input board, horizontal start write (HSWR/) as seen in FIGS. 7 and 8, loads data bits D0:3 from data bus 73 through TTL-ECL translator 138 into registers 136 and 137 over line 145. Then during HSYNC/ over line 87, which is a short pulse, the value is loaded from register 137 through buffer 146 into 12 counter 141 which, through ECL-TTL translator 142, outputs XINC, the X increment clock for the FSM, over line 143. This load sets the phase of the count relative to HSYNC/. On subsequent counts, the number 4 is loaded over line 147 into the 12 counter so that the counter increments from 4 to F hex. Note that HCLK, applied to the 12 counter over line 151, is the pixel clock and XINC is the X address increment clock and that there are twelve pixels per X-address. On the FSM board, HSWR/ loads D4:7 into register 136 over data bus 73. HSYNC/ on line 87 parallel loads this offset into X-address counter 152 which is incremented by the X-increment signal, XINC, for an output of X0:5 over line 150. Incrementing the value moves the image left. It must be remembered that HSYNC/ occurs at the end of a horizontal line so that a large offset is close to the maximum count and therefore image data is loaded onto the XA=00 address sooner.

With respect to horizontal width, the sampling rate of the horizontal analog-to-digital converters in horizontal filters 76 is controlled by the count of phase-locked-loop 82, and the dominant visible effect is picture-width together with a minor shift in horizontal position. The phase-locked-loop counter decrements from the count to zero. The count is loaded into register 153 through TTL-ECL translator 154 by PLLWR/ from function decoder 124 over line 155 and is transferred to loop counter 82 by the zero terminal count. Phase-locked-loop frequency is set for 752 samples per active input period. For longer periods, the frequency is lowered by loading a smaller count and vice versa for shorter active periods.

Figure 9:
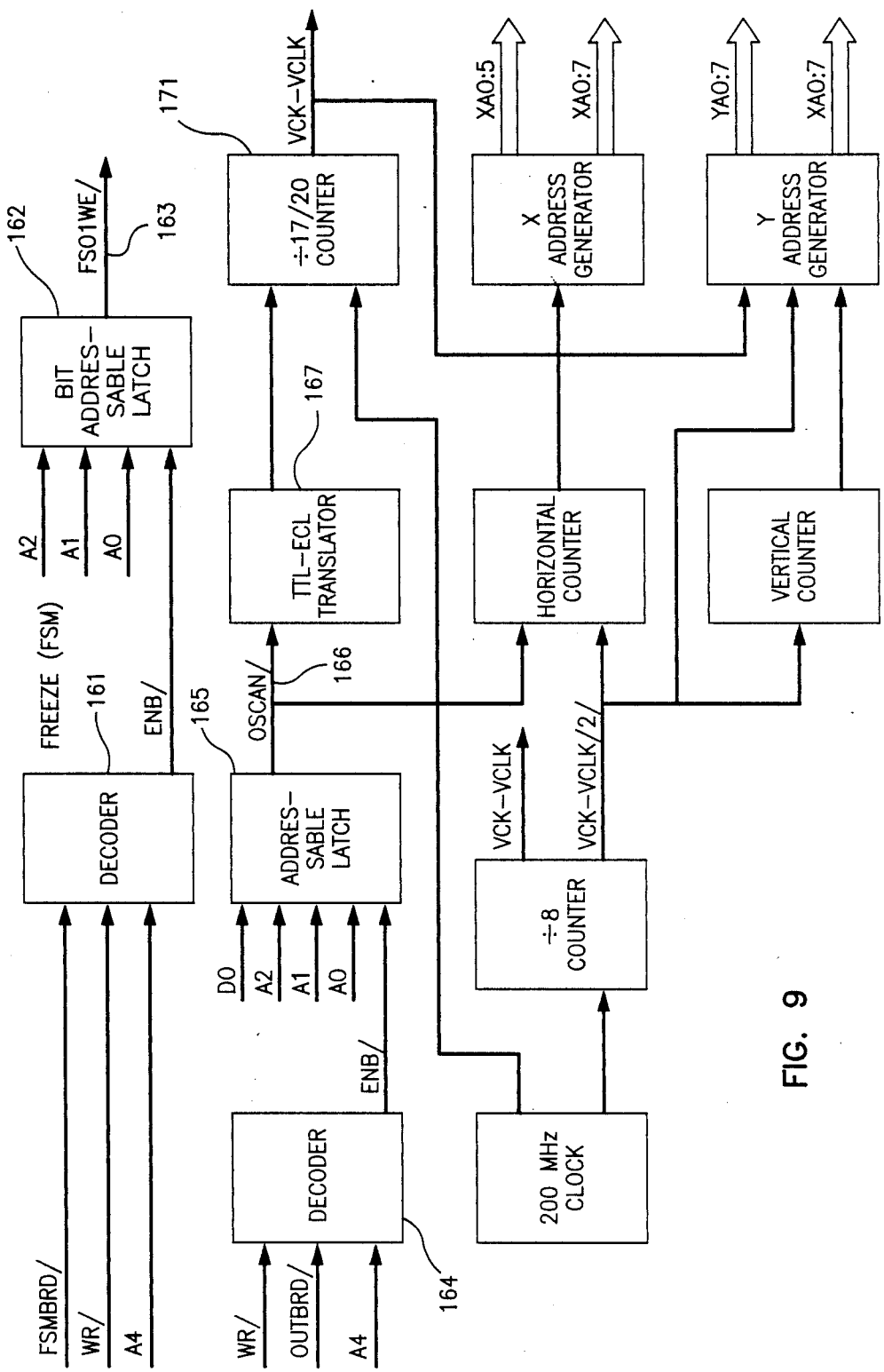
FIG. 9 is a functional block diagram in the set-up mode of the frame storage memory and output functions of the interactive video standards converter of the invention.

In the normal conversion process mode, two frame store memories on FSM board 85 continuously toggle between read and write. In the freeze mode as shown in FIG. 9, an enable signal, ENB/, is output from decoder 161 when FSMBRD/ and WR/ and A4 are all at logic L (low). The enable signal decodes (A2, A1, A0) equal (LLL) in bit addressable latch 162 and sets FS01WE/ equal H (high) on output line 163 to inhibit capture by the FSM frame stores, which are no simply read and refreshed.

Nominal dimensions of the data captured by frame store memories 85 is 752 H×1024 V in overscan and 640 H×1024 V in underscan. Data captured by triple buffered field store memory 95 (FIG. 5) is scaled by a factor of +9% in overscan and −9% in underscan. Dimensions of data in the field stores are 752×484 for overscan and 640×409 for underscan. Additionally, the trim of the picture is different for underscan as opposed to overscan. Therefore, the vertical position, horizontal position and phase-locked-loop parameters are stored in the NVRAM for both scan modes. When (WR/, OUTBRD/, A4) equals (LLL) is put out from the microcontroller to decoder 164 it activates ENB/ which enables decoding of A2, A1 and A0 in addressable latch 165. If (A2, A1, A0) equals (HHH), then bit 7 (OSCAN/) on line 166 from the latch is loaded through TTL-ECL translator 167 with the D0 bit from the microprocessor into 17/20 counter 171. In overscan the 17 counter is selected and in underscan, the 20 is selected. The rest of FIG. 9 is merely a graphical implementation of the microcontroller functions, would be understood by those of ordinary skill in the art and need not be further discussed here. The outputs of FIGS. 8 and 9 which have not been specifically described all vanish into the timing blocks of FIG. 5.

It should be noted here that several other implementations of the invention are possible. For test purposes, the invention has controlled set-up via a terminal connected to RS-232 interface 103, as shown in FIG. 5, which communicates with the microcontroller within the standards converter. Another implementation would be through a remote control unit that might transmit, for example, over an infrared link. Although the embodiment employed as an example for discussion pertains to the 1000-line video sources that are converted to RS170A video, the user interface technology of this invention is generally applicable to other resolutions. For example, it could be used to convert 2000-line to HDTV, 1000-line repeat field to HDTV, conversion to PAL and SECAM, among others.

In view of the above description, it is likely that modifications and improvements will occur to those skilled in the art which are within the scope of the accompanying claims.

What is claimed is:

1. An adaptive video standards format converter interface for use with a video standards converter having means for receiving video signals in one format and converting them to signals in a different format, the input to the conventional converter being applied to horizontal filters and a sync separator, the horizontal sync signal from the sync separator being applied to a phase-locked-loop and to a horizontal filter timing block while the phase-locked-loop output is also applied to the timing block, the output of the timing block being applied to the horizontal filters and to frame store memories where the signals from the horizontal filters are rotated by 90° and passed on to vertical filters, the vertical sync signal from the sync separator being applied to a vertical filter timing block and a video timing block, outputs from the vertical filter timing block being applied to the frame store memories, the vertical filters and to field store memories which also receive and rotate a reverse 90° the signals from the vertical filters, the output of the field store memories being applied to a video encoder, outputs of the video timing block being applied to the field store memories and the video encoder, with the transformed composite video signal being output from the video encoder, wherein the improvement comprises:

a control switch matrix having set-up function switches;

a microcontroller coupled to said switch matrix and responding to the condition of said switch matrix to set up the video standards converter;

means for coupling said set-up signals to said phase-locked-loop, to said horizontal filter timing block, to said vertical filter timing block and to said video timing block, to affect their respective outputs; and means for coupling said microcontroller to said frame store memories and to said field store memories;

whereby by means of said set-up function switches, said video standards converter is interactively adjusted for optimal video output as determined visually.

2. The converter interface recited in claim 1, wherein said switch matrix is controlled by a plurality of manually actuable means on an external panel of said interface.

3. The converter interface recited in claim 2, wherein said manually actuable means comprise push button switches having set up functions including vertical centering, horizontal centering and horizontal width, the effects of such functions being observable visually.

4. The converter interface recited in claim 3, wherein said manually actuable means further comprise push button switches having set up functions including scan, freezeframe, test and run, all of which operate through said microcontroller to optimize the output of the video standards converter.

5. The converter interface recited in claim 4, wherein said microcontroller includes registers adapted to store data sensed from said switch matrix.

6. The converter interface recited in claim 2, wherein actuating said manually actuable means causes incremental changes in the video image.

7. A method for interactively setting up a video standards converter for receiving video signals in one format and converting them to signals in a different format, said method comprising the steps of:

actuating function switches in a control switch matrix;

sampling the switch matrix by means of a microcontroller to detect actuated switches;

generating signals by the microcontroller in response to each actuated function switch;

selectively coupling said generated signals to a phase-locked-loop, a horizontal filter timing block, a vertical filter timing block and a video timing block in the video standards converter to modify the video signal transformation process in the video standards converter so that video output from the converter is improved as determined visually; and continuing to actuate function switches and modifying the converter output video signals interactively until optimal video output from the converter is achieved as determined visually.

8. The method recited in claim 7, wherein the video standards converter includes frame store memories which normally toggle between read and write, said method comprising the further step of:

inhibiting capture by the frame store memories by means of an enable signal so that the outputs of the frame store memories are simply read and refreshed.

9. The method recited in claim 7, wherein the switch matrix includes vertical centering switches and the microcontroller includes a vertical position register, said method comprising the further steps of:

writing the contents of the vertical position register to hardware that translates the vertical location of the image relative to a nominal value;

incrementing the value to move the image up by actuating a first vertical centering switch in the switch matrix; and decrementing the value to move the image down by actuating a second vertical centering switch in the switch matrix.

10. The method recited in claim 7, wherein the switch matrix includes horizontal centering switches and the microcontroller includes a horizontal position register, said method comprising the further steps of:

writing the contents of the horizonal position register to hardware that translates the horizontal location of the image relative to a nominal value;

incrementing the value to move the image in one direction by actuating a first horizontal centering switch in the switch matrix; and decrementing the value to move the image in the opposite direction by actuating a second horizontal centering switch in the switch matrix.

11. A method for interactively setting up a video standards converter for receiving video signals in one format and converting them to signals in a different format, said method comprising the steps of:

actuating function switches in a control switch matrix;

sampling the switch matrix by means of a microcontroller to detect actuated switches;

generating signals by the microcontroller in response to each actuated function switch;

selectively coupling said generated signals to the video standards converter to modify the video signal transformation process therein;

matching the two dimensional sampling aperture of the standards converter to the timing of the incoming video signals; and continuing to actuate function switches and modifying the converter output video signals interactively until optimal video output from the converter is achieved as determined visually.

12. The method recited in claim 11, wherein the video standards converter includes frame store memories which normally toggle between read and write, said method comprising the further step of:

inhibiting capture by the frame store memories by means of an enable signal so that the outputs of the frame store memories are simply read and refreshed.

13. The method recited in claim 11, wherein the switch matrix includes vertical centering switches and the microcontroller includes a vertical position register, said method comprising the further steps of:

writing the contents of the vertical position register to hardware that translates the vertical location of the image relative to a nominal value;

incrementing the value to move the image up by actuating a first vertical centering switch in the switch matrix; and decrementing the value to move the image down by actuating a second vertical centering switch in the switch matrix.

14. The method recited in claim 11, wherein the switch matrix includes horizontal centering switches and the microcontroller includes a horizontal position register, said method comprising the further steps of:

writing the contents of the horizontal position register to hardware that translates the horizontal location of the image relative to a nominal value;

incrementing the value to move the image in one direction by actuating a first horizontal centering switch in the switch matrix; and decrementing the value to move the image in the opposite direction by actuating a second horizontal centering switch in the switch matrix.

* * * * *